(12) United States Patent
Eggert et al.

(10) Patent No.: US 7,614,666 B2
(45) Date of Patent: Nov. 10, 2009

(54) END SECTION OF A FLUID LINE WITH MOLDED-ON PUSH-IN FITTING

(75) Inventors: Uwe Eggert, Oberdorla (DE); Heiko Heim, Mühlhausen (DE); Martin Kollmann, Ibind (DE); Jochen Schneier, Zapfendorf (DE)

(73) Assignee: FTE automotive GmbH, Ebern (DE)

( * ) Notice: Subject to any disclaimer, the term of this patent is extended or adjusted under 35 U.S.C. 154(b) by 0 days.

(21) Appl. No.: 11/371,731

(22) Filed: Mar. 9, 2006

(65) Prior Publication Data
US 2006/0202476 A1    Sep. 14, 2006

(30) Foreign Application Priority Data
Mar. 10, 2005    (DE)    .................. 10 2005 010 950

(51) Int. Cl.
*F16L 39/00*    (2006.01)
(52) U.S. Cl. .................. 285/321; 285/293.1; 285/305; 285/423
(58) Field of Classification Search .............. 285/293.1, 285/294.1, 294.4, 319, 321, 921, FOR. 168, 285/FOR. 169, 423, 305, 98, 121.3, 121.6, 285/351
See application file for complete search history.

(56) References Cited

U.S. PATENT DOCUMENTS 3,154,283 A * 10/1964 Spinnato .................. 248/218.4
3,428,340 A * 2/1969 Pelton .......................... 285/95
3,439,944 A * 4/1969 Leutenegger ................ 285/321
3,584,902 A * 6/1971 Vyse ........................... 285/305
4,725,081 A * 2/1988 Bauer .......................... 285/305
5,324,081 A    6/1994 Umezawa
5,429,395 A    7/1995 Ketcham
6,371,528 B1    4/2002 Kimura
2004/0051313 A1    3/2004 Trouyet

FOREIGN PATENT DOCUMENTS

| CA | 2272016 | 11/1999 |
| DE | 195 43 318 A1 | 5/1997 |
| EP | 0 287 791 A2 * | 5/1988 |
| EP | 0 840 051 B1 | 3/2001 |

* cited by examiner

*Primary Examiner*—Aaron M Dunwoody
*Assistant Examiner*—Fannie Kee
(74) *Attorney, Agent, or Firm*—Reising Ethington P.C.

(57) ABSTRACT

An end section of a plastic fluid line with a push-in fitting is injection molded on coaxially for sealed push-in connection to a mating element of complementary shape with the aid of a securing element which transmits axial forces. The assembly formed of an end section and push-in fitting has a first circumferential groove on the end section, in the region of which the push-in fitting is molded on with form-fitting penetration of the plastic of the push-in fitting into the first circumferential groove. The end section, in the joining direction of the push-in fitting, protrudes axially beyond the latter and has a second circumferential groove for receiving a sealing ring. A third circumferential groove for receiving the securing element is molded into the push-in fitting on the outer circumference thereof.

13 Claims, 4 Drawing Sheets

END SECTION OF A FLUID LINE WITH MOLDED-ON PUSH-IN FITTING

TECHNICAL FIELD

The invention relates to the design of an end section of a fluid line with a molded-on push-in fitting. In particular, the invention relates to an end section with a molded-on push-in fitting for releasable push-in connections to a mating element of complementary shape, such as the connection piece of an element of a hydraulic system, or to another fluid line. Such push-in connections are used in large numbers in particular in the automotive sector for hydraulic clutch and brake systems.

DESCRIPTION OF THE PRIOR ART

In a known connection for connecting a plastic fluid line to a plastic tubular coupling element (see DE-A-195 43 318), which may be designed as a push-in coupling, the inner end section of the coupling element, as seen in the joining direction, is injection-molded coaxially around the end section of the fluid line to produce a material bond. In front of the end section of the fluid line as seen in the joining direction of the coupling element, two sealing rings in the form of O-rings and an intermediate securing ring are inserted into a cylindrical hollow space of the coupling element. This sealing arrangement is designed to provide sealing with respect to the outer circumference of a complementary tubular section of a mating element which is pushed into the cylindrical hollow space. However, in this arrangement, during operation of the fluid line, the connection between the fluid line and the push-in fitting is exposed to the hydraulic pressure prevailing therein. Furthermore, this ring arrangement which consists of three parts is inserted loose into the cylindrical hollow space, which is open towards the outside in the joining direction in the uninstalled state and does not have an abutment for the ring arrangement, and thus is not protected against loss. The injection molding of the end section of the fluid line with the coupling element takes place on the cylindrical outer circumference of the fluid line, so that there is only a limited durability of the connection between the fluid line and the coupling element with respect to axial pulling forces.

Furthermore, EP-A-0 840 051 discloses a hose connection in which one end of a plastic hose is provided on its outer circumference with a circumferential groove in which an annular base of a plastic securing element is received. Hook-like engagement sections extend away from the base of the securing element, and these serve to fix the hose end in a tubular fitting element made of metal, wherein the hook-shaped engagement sections engage behind an edge section of the fitting element which is bent radially outwards. When this hose connection is subjected to pressure, a not inconsiderable deformation of the engagement sections may occur, associated with an axial relative movement between the hose end and the fitting element counter to the joining direction, which ultimately leads to undesirable dead volumes in the hose connection, that is to say to a volume uptake by the hose connection when subjected to pressure.

SUMMARY OF THE INVENTION

The object of the invention is to provide an end section of a fluid line with molded-on push-in fitting, in which the connection between the fluid line and the push-in fitting is not exposed to the hydraulic pressure in the fluid line, which can withstand even very high axial pushing and/or pulling forces without producing undesirable dead volumes, and in which the sealing arrangement provided for sealing with respect to the mating element of complementary shape cannot be lost.

According to the invention, in an end section of a plastic fluid line with a plastic push-in fitting which is molded on coaxially by injection molding for sealed push-in connection to a mating element of complementary shape with the aid of a securing element which transmits axial forces, arranged on the end section is a first circumferential groove, in the region of which the push-in fitting is molded on with form-fitting penetration of the plastic of the push-in fitting into the first circumferential groove, wherein the end section, in a joining direction of the push-in fitting, protrudes axially beyond the latter with a region, and in the region which protrudes beyond the push-in fitting has a second circumferential groove for receiving a sealing ring, and wherein a third circumferential groove for receiving the securing element is molded into the push-in fitting on an outer circumference thereof.

By virtue of the arrangement of the first circumferential groove on the end section of the fluid line, a form-fitting clamping action is achieved between the end section and the push-in fitting, which withstands even very high axial forces. The second circumferential groove reliably secures a sealing ring placed therein against loss during transport of the end section up until the push-in connection is established. When the push-in connection to a mating element of complementary shape is brought about, the external arrangement of the sealing ring prevents the connection between the end section of the fluid line and the push-in fitting from being exposed to the hydraulic pressure during operation of the fluid line. Finally, when the push-in connection is subjected to pressure, the third circumferential groove in the push-in fitting allows the introduction of a (reaction) force, via the securing element, into the push-in fitting close to the outer diameter of the fluid line, so that the connection between the end section of the fluid line and the push-in fitting is subjected to stress mainly in the axial direction, that is to say to shear, without it being possible for excessive deformations and thus associated dead volumes to occur.

In a first embodiment of the invention, the first circumferential groove advantageously has a cylindrical groove bottom and is delimited on both sides by annular radial faces. The first circumferential groove thus forms, with its two annular radial faces, secure abutments for the push-in fitting when axial forces occur.

Instead of a cylindrical groove bottom, the first circumferential groove may also have a groove bottom which is provided with profiling. As a result—compared to a circumferential groove which has the same width but a cylindrical groove bottom—the surface area of the join between the fluid line and the push-in fitting is increased in a simple manner, which promotes the strength of the connection between the push-in fitting and the fluid line.

In order to anchor the push-in fitting in the first circumferential groove, it is furthermore advantageous if the width of the first circumferential groove is selected such that it is greater than or equal to the outer diameter of the fluid line. The region of the push-in fitting which extends into the first circumferential groove in this case has a considerable axial length and can therefore cope even with very high shear forces acting in the axial direction.

In a second embodiment of the invention, the first circumferential groove is formed between an abutment zone with a steadily decreasing outer diameter of the end section and an annular abutment protrusion of the end section which is formed at an axial distance therefrom by axial swaging. This embodiment is characterized in that the first circumferential groove is delimited on both sides by rounded transitions to the end section of the fluid line, which reduces the notching effect at these locations without losing the effect of the abutment with respect to axial forces.

In the second embodiment of the invention, it is possible that the end section, after the abutment protrusion as seen in the joining direction, retains the smallest diameter formed by the abutment zone up to a radial annular face on the region of the end section which protrudes axially beyond the push-in fitting in the joining direction, wherein the push-in fitting ends with an annular radial face and wherein the second circumferential groove is formed between the radial annular face and the annular radial face. The fact that the push-in fitting is used to form the second circumferential groove results inter alia in an advantageous lengthening of the push-in fitting and thus an increase in the injection-molded adhesion surface area.

It is furthermore advantageous if the third circumferential groove for receiving the securing element is molded into the push-in fitting axially in the region of the first circumferential groove, as a result of which on the one hand the introduction of the (reaction) force via the securing element into the push-in fitting can take place particularly far inwards as seen in the radial direction, and on the other hand forces can be passed very directly from the securing element via the push-in fitting to the end section of the fluid line and vice versa. In this case, the third circumferential groove may for example have in the groove bottom a diameter which corresponds approximately to the outer diameter of the fluid line in front of the push-in fitting as seen in the joining direction of the push-in fitting.

The securing element is preferably a cost-effective spring clip.

Furthermore, between the second circumferential groove and the third circumferential groove, the push-in fitting may have a widening zone for the securing element, said widening zone having an outer diameter which steadily decreases in the joining direction, via which the securing element can be expanded during joining of the push-in connection with a moderate push-in force requirement. Moreover, during joining of the push-in connection, the widening zone can serve to center the end section on the mating element.

In continuation of the inventive concept, between the second circumferential groove and the third circumferential groove, the push-in fitting may have a cylindrical guide zone for tightly guiding the end section in an associated channel of the mating element. This configuration of the push-in fitting—compared to a configuration of the push-in fitting without a cylindrical guide zone—relieves the load on the connection between the push-in fitting and the fluid line, especially in the event of bending stress or reverse bending stress.

In one preferred pairing of materials, the end section is formed from polyamide 12, while the push-in fitting is formed from polyamide 6.6 with a glass fiber content of 35%. Finally, the two polyamide materials used can advantageously be adhesion-modified in order to improve the binding of the materials.

BRIEF DESCRIPTION OF THE DRAWINGS

Further details regarding the invention will be explained in more detail below in three examples of embodiments and with reference to the appended drawings. In the drawings.

Figure 3:
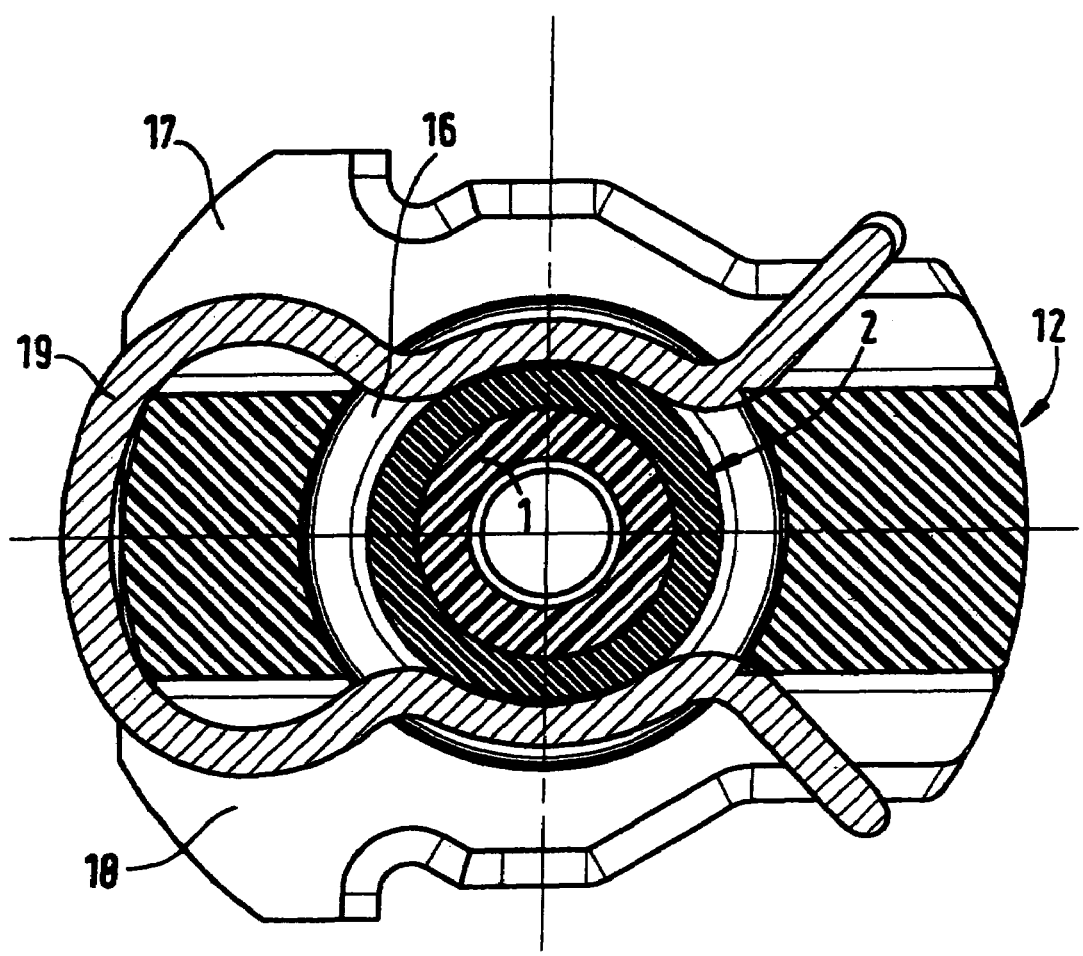
FIG. 3 shows the cross-sectional view along the section line III-III in FIG. 2.

The subject matter of the application is shown in the drawings on an enlarged scale compared to the actual size. The cross-sectional view shown in FIG. 3 is the same for the second and third embodiments of the end section as shown in FIGS. 4, 5 and 6, 7, respectively.

DETAILED DESCRIPTION OF THE EXAMPLES OF EMBODIMENTS

Figure 1:
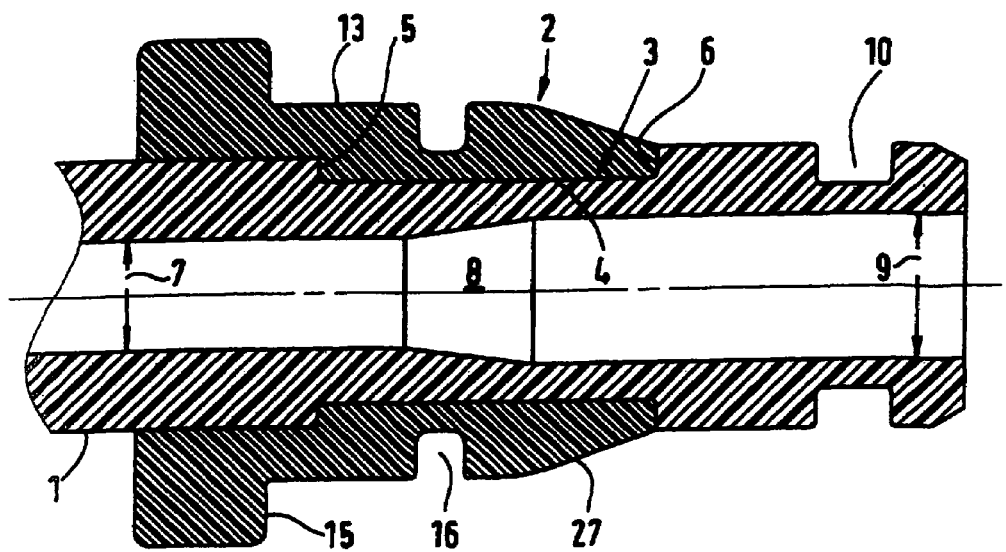
FIG. 1 the broken-off longitudinal section through a first embodiment of end section with molded-on push-in fitting.
Figure 2:
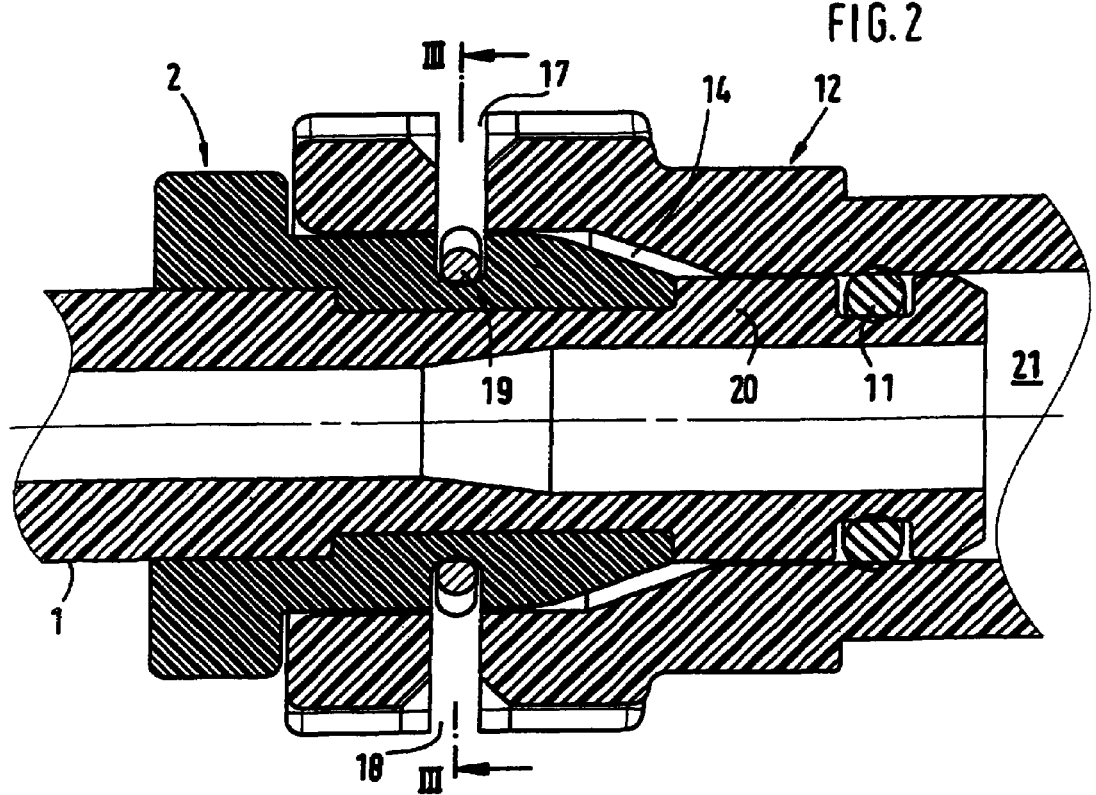
FIG. 2 shows the push-in connection of the end section of FIG. 1 to a mating element of complementary shape, in longitudinal section.

FIGS. 1 and 2 show the end section of a fluid line 1, which is made of plastic, preferably of polyamide 12. A push-in fitting 2 is molded coaxially onto the end section in the present example so as to form a material bond and, as will be described in more detail below, also in a form-fitting manner, by injection-molding a plastic, preferably polyamide 6.6 with a glass fiber content of 35%, around the end section. The two polyamide materials can be adhesion-modified in a known manner in order to improve the binding of the materials.

Arranged on the end section of the fluid line 1 is a first circumferential groove 3, in the region of which the push-in fitting 2 is molded on with form-fitting penetration of the plastic of the push-in fitting 2 into the first circumferential groove 3. The first circumferential groove 3, which can be formed by machining, has a cylindrical groove bottom 4 coaxial with the longitudinal axis of the end section, and is delimited on both sides by annular radial faces 5 and 6. The radial faces 5, 6 are the abutments for axial fixing of the push-in fitting 2 on the end section of the fluid line 1. In the example shown, the width of the first circumferential groove 3 is greater than the outer diameter of the fluid line 1, as a result of which the first circumferential groove 3 extends over a considerable axial length of the end section.

Within the end section and in the axial region of the first circumferential groove 3, the inner diameter 7 of the fluid line 1 expands with a truncated-cone-shaped transition 8 to the outlet diameter 9 of the end section.

The end section of the fluid line 1 protrudes beyond the push-in fitting 2 in the axial direction. In the region of the end section which protrudes beyond the push-in fitting 2, a second circumferential groove 10 is formed, for example by machining, hot stamping or the like, which is provided for receiving a sealing ring 11 which is shown in FIG. 2 and is designed as an O-ring.

FIG. 2 shows the push-in connection of the end section of FIG. 1 to a mating element 12 of complementary shape. The mating element 12 partially engages over the push-in fitting 2, with the cylindrical central region 13 of the push-in fitting 2 being received in a correspondingly shaped and dimensioned bore 14 of the mating element 12. The push-in distance of the end section is limited by an annular shoulder 15 molded onto the push-in fitting 2, said annular shoulder butting against the mating element 12 when inserted.

In this position of end section and mating element 12, a third circumferential groove 16 which is molded into the push-in fitting 2 on the outer circumference thereof is aligned with corresponding slots 17 and 18 in the mating element 12, so that a spring clip 19, which secures the push-in connection against axial relative movements between end section and mating element 12, can be inserted to engage in the slots 17, 18 and in the circumferential groove 16, said spring clip nevertheless usually being preinstalled. As can clearly be seen in FIGS. 1 and 2, the third circumferential groove 16 for receiving the spring clip 19 is molded into the push-in fitting 2 axially in the region of the first circumferential groove 3. The third circumferential groove 16 has in the groove bottom a diameter which corresponds approximately to the outer diameter of the fluid line 1 in front of the push-in fitting 2 as seen in the joining direction of the push-in fitting 2.

As can be seen from FIG. 2, the end section of the fluid line 1 engages with its cylindrical region 20 protruding beyond the push-in fitting 2 in the correspondingly dimensioned hollow-cylindrical channel 21 of the mating element 12. The sealing ring 11 in the second circumferential groove 10 bears in a sealing manner against the wall of the channel 21 and on the one hand seals the push-in connection, that is to say the end section of the fluid line 1 with respect to the mating element 12, and in the process ensures, on the other hand, that the hydraulic pressure of the fluid in the fluid line 1 and the channel 21 cannot act directly on the connection between the push-in fitting 2 and the end section of the fluid line 1, which connection thus need not be hydraulically sealed.

It should be noted at this point that a steel sleeve (not shown) can be pressed into the end section of the fluid line 1 on the inner circumference thereof, said steel sleeve extending in the axial direction up to the push-in fitting 2 and possibly beyond. By means of such a steel sleeve, the end section of the fluid line 1 can be stiffened or reinforced in particular in the region of the second circumferential groove 10, so that the relatively thin wall of the end section of the fluid line 1 in the region of the groove bottom of the second circumferential groove 10 is not exposed to excessively high mechanical stress particularly during a change in hydraulic load.

Figure 4:
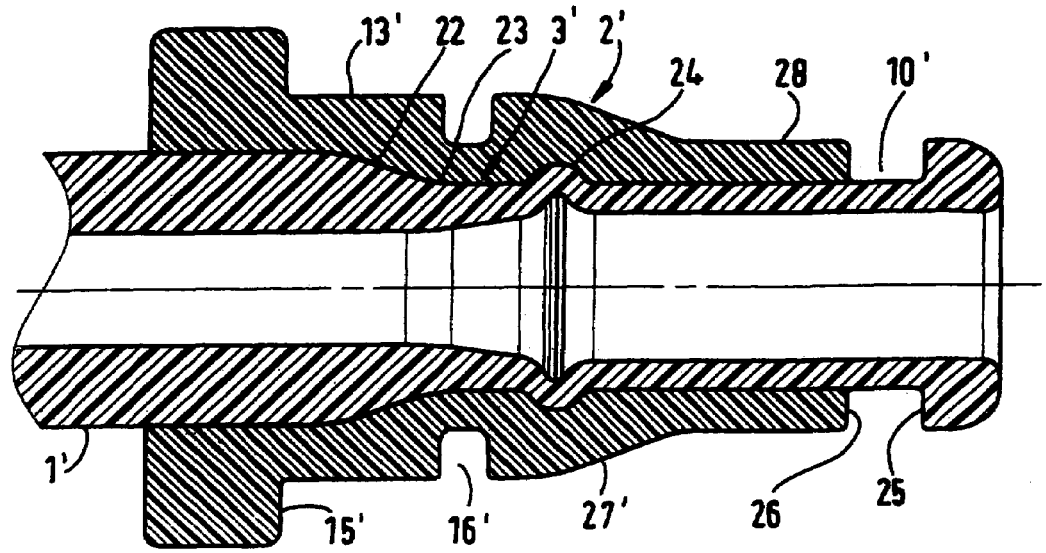
FIG. 4 shows a broken-off longitudinal section through a second embodiment of end section with molded-on push-in fitting.
Figure 5:
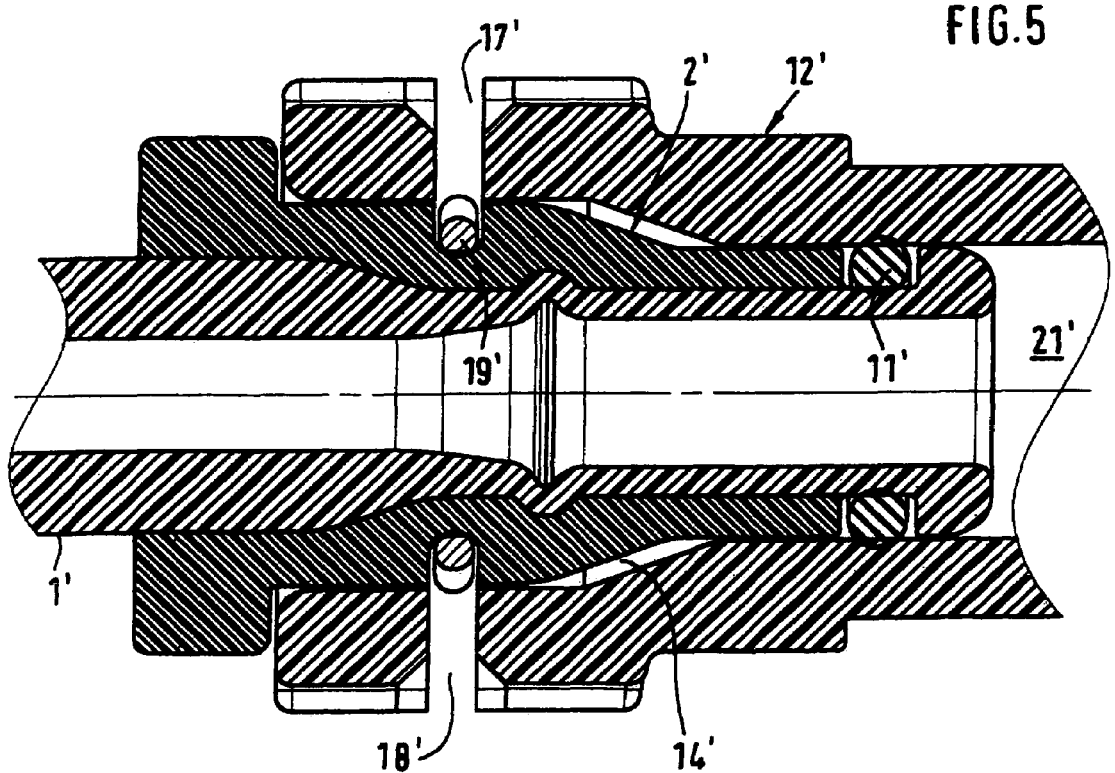
FIG. 5 shows the push-in connection of the end section of FIG. 4 to a mating element of complementary shape, in longitudinal section.

To describe the second embodiment, reference will now be made to FIGS. 4 and 5. This embodiment differs from the above-described first embodiment essentially by the different design of the first circumferential groove 3' and of the second circumferential groove 10' on the end section of the fluid line 1'.

The first circumferential groove 3' in this case does not start at a radial face, but rather at an abutment zone 22 in which the outer diameter of the end section of the fluid line 1' steadily decreases down to the diameter of a cylindrical section 23. The circumferential groove 3' ends at an annular abutment protrusion 24 which is at an axial distance from the abutment zone 22 and is formed by axial swaging of the end section.

The end section of the fluid line 1', after the abutment protrusion 24 as seen in the joining direction, retains the diameter of the cylindrical section 23, which is formed as the smallest diameter of the abutment zone 22, up to a radial annular face 25 on the region of the end section which protrudes axially beyond the push-in fitting 2' in the joining direction.

The push-in fitting 2' ends with an annular radial face 26 which, together with the opposite annular face 25 and part of the cylindrical section 23, delimits or forms the second circumferential groove 10'.

In this second embodiment, too, in the same way as described above, a sealing ring 11' placed in the second circumferential groove 10' seals both the push-in connection per se and the connecting surface area between the end section of the fluid line 1' and the push-in fitting 2' against the hydraulic pressure in the fluid line. In the second embodiment, too, a spring clip 19' ensures the fixing of the push-in connection, said spring clip being received in the third circumferential groove 16' of the push-in fitting 2'.

Finally, another common feature of the first and second embodiments (cf. FIGS. 1 and 4) is that, between the second circumferential groove 10, 10' and the third circumferential groove 16, 16', the push-in fitting 2, 2' has a widening zone 27, 27' which has an outer diameter which steadily decreases in the joining direction, that is to say tapers essentially conically in the joining direction. Upon joining of the push-in connection, this widening zone 27, 27' serves on the one hand to elastically expand the preinstalled spring clip 19, 19' before the latter latches into the third circumferential groove 16, 16' of the push-in fitting 2, 2', and on the other hand to centre the end section of the fluid line 1, 1' on the mating element 12, 12'. While in the first embodiment shown in FIGS. 1 and 2 the widening zone 27 of the push-in fitting 2 is adjoined in the direction of the second circumferential groove 10 by the cylindrical region 20 of the end section of the fluid line 1, in the second embodiment shown in FIGS. 4 and 5 the widening zone 27' of the push-in fitting 2' merges into a cylindrical guide zone 28 of the push-in fitting 2', which ends at the radial face 26 of the second circumferential groove 10' and thus also lies between the second circumferential groove 10' and the third circumferential groove 16'. As shown here in FIG. 5, the cylindrical guide zone 28 serves to tightly guide the push-in fitting 2' and thus indirectly the end section of the fluid line 1' in the associated channel 21' in the mating element 12'.

Figure 6:
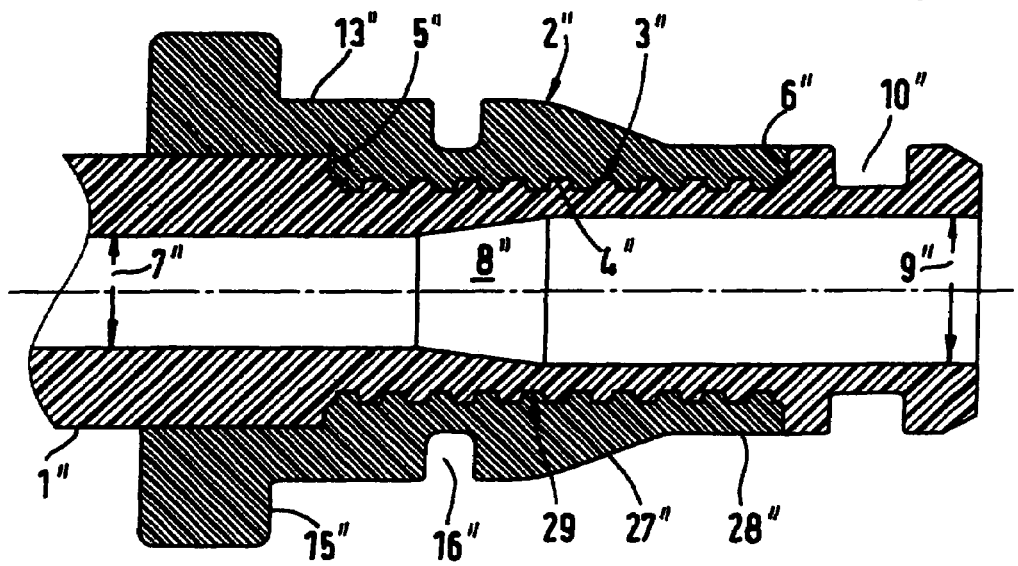
FIG. 6 shows a broken-off longitudinal section through a third embodiment of end section with molded-on push-in fitting.
Figure 7:
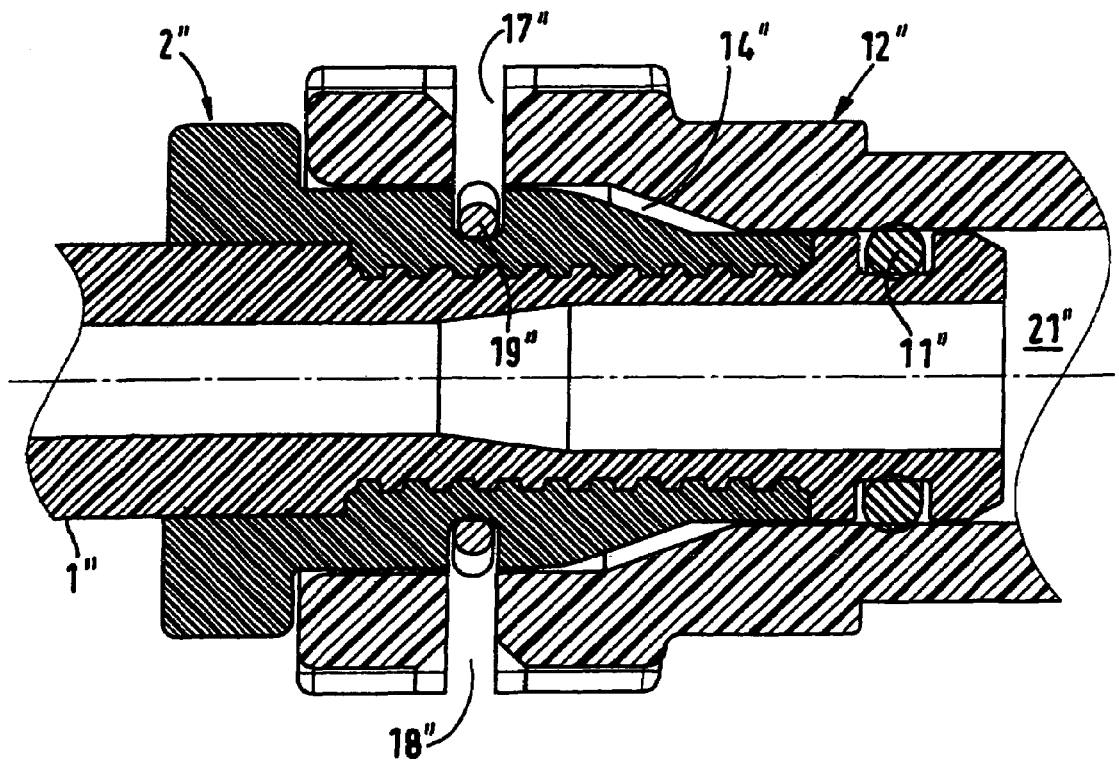
FIG. 7 shows the push-in connection of the end section of FIG. 6 to a mating element of complementary shape, in longitudinal section.

FIGS. 6 and 7 show the third embodiment, which will be described only in so far as it differs from the first and second embodiments described above with reference to FIGS. 1 to 5.

The third embodiment is in principle a modification of the first embodiment. As shown by comparing FIGS. 1 and 6, in the third embodiment the first circumferential groove 3''' extends in the axial direction over a relatively long area, namely up to close to the second circumferential groove 10''. The push-in fitting 2'' has been lengthened accordingly, and specifically in such a way that the widening zone 27'' is adjoined by a cylindrical guide zone 28'' of the push-in fitting 2'' which can be supported radially in the channel 21'' of the mating element 12'', in a manner analogous to the second embodiment. From FIG. 7, which shows the joined state of the push-in connection, it is obvious to the person skilled in the art that, with this configuration of push-in fitting 2'' and first circumferential groove 3''', both the connection between the end section of the fluid line 1'' and the push-in fitting 2'' and the relatively thin-walled cross section of the fluid line 1'' in the region of the groove bottom 4'' close to the radial face 6'' are subjected to considerably less stress than in the first embodiment when the fluid line 1'' is exposed to bending stresses or reverse bending stresses.

Finally, in the third embodiment, the groove bottom 4'' of the first circumferential groove 3'' is configured differently than in the first embodiment, specifically is provided with profiling 29 which in the illustrated example is formed by a plurality of circumferential furrows but can also be formed by other depressions/raised areas on the groove bottom 4'' which increase the contact area between the fluid line 1'' and the push-in fitting 2''. Such a profiling 29 can be formed by machining, hot stamping, or the like. Although not shown in FIGS. 1 to 5, such a profiling may also be provided on the first circumferential groove 3, 3' of the first and second embodiment.

In summary, there is disclosed an end section of a plastic fluid line with a plastic push-in fitting which is molded on coaxially by injection molding for sealed push-in connection to a mating element of complementary shape with the aid of a securing element which transmits axial forces. The assembly formed of end section and push-in fitting is characterized in that (a) arranged on the end section is a first circumferential groove, in the region of which the push-in fitting is molded on with form-fitting penetration of the plastic of the push-in fitting into the first circumferential groove, (b) the end section, in the joining direction of the push-in fitting, protrudes beyond the latter in the axial direction, and in the region which protrudes beyond the push-in fitting has a second circumferential groove for receiving a sealing ring, and (c) a third circumferential groove for receiving the securing element is molded into the push-in fitting on the outer circumference thereof. Such an assembly consisting of end section and push-in fitting is cost-effective to manufacture, can withstand even high pushing and/or pulling forces without producing undesirable dead volumes and ensures in a simple manner that the seal which seals the push-in connection is held such that it cannot be lost.

We claim:

1. A combination of a plastic push-in fitting, a securing element and a plastic fluid line having an end section for sealed push-in connection to a mating element of complementary shape with the aid of said securing element which transmits axial forces, said plastic push-in fitting being molded on the end section coaxially by injection molding, and said end section protruding axially beyond the push-in fitting toward a distal end of the end section with a region, said combination comprising:
   a first circumferential groove formed into the end section in the region of which the push-in fitting is molded on with form-fitting penetration of the plastic of the push-in fitting into the first circumferential groove so that plastic of the plastic push-in filling completely fills the first circumferential groove from end to end, for axially affixing the push-in fitting to the end section,
   a second circumferential groove formed into the end section in the region which protrudes beyond the push-in fitting for receiving a sealing ring, said second circumferential groove being axially spaced from the first circumferential groove, and
   a third circumferential groove for receiving the securing element, said third circumferential groove being molded into the push-in fitting on an outer circumference thereof.

2. A combination of a plastic push-in fitting, a securing element and a plastic fluid line according to claim 1, wherein the first circumferential groove has a cylindrical groove bottom and is delimited on both sides by annular radially extending faces with inner and outer diameters.

3. A combination of a plastic push-in fitting, a securing element and a plastic fluid line according to claim 1, wherein the first circumferential groove has a groove bottom which is delimited on both sides by annular radial faces and is provided with profiling.

4. A combination of a plastic push-in fitting, a securing element and a plastic fluid line according to claim 1, wherein the first circumferential groove has a width which is greater than or equal to an outer diameter of the fluid line.

5. A combination of a plastic push-in fitting, a securing element and a plastic fluid line according to claim 1, wherein the first circumferential groove is formed between an abutment zone with a steadily decreasing outer diameter of the end section and an annular abutment protrusion of the end section which is formed at an axial distance therefrom by axial swaging.

6. A combination of a plastic push-in fitting, a securing element and a plastic fluid line according to claim 5, wherein the end section has a radial face on the region of the end section which protrudes axially beyond the push-in fitting in a joining direction and the end section after the abutment protrusion as seen in the joining direction, retains the smallest diameter formed by the abutment zone up to the radial annular face of the end section, wherein the push-in fitting ends with an annular radial face, and wherein the second circumferential groove is formed between the radial annular face and the annular radial face.

7. A combination of a plastic push-in fitting, a securing element and a plastic fluid line according to claim 1, wherein the third circumferential groove for receiving the securing element is molded into the push-in fitting axially in the region of the first circumferential groove.

8. A combination of a plastic push-in fitting, a securing element and a plastic fluid line according to claim 7, wherein the third circumferential groove has a groove bottom with a diameter which corresponds approximately to the outer diameter of the fluid line in front of the push-in fitting toward the distal end of the end section.

9. A combination of a plastic push-in fitting, a securing element and a plastic fluid line according to claim 1, wherein the securing element is a spring clip.

10. A combination of a plastic push-in fitting, a securing element and a plastic fluid line according to claim 1, wherein the push-in fitting has a widening zone for the securing element between the second circumferential groove and the third circumferential groove, said widening zone having an outer diameter which steadily decreases toward the distal end of the end section.

11. A combination of a plastic push-in fitting, a securing element and a plastic fluid line according to claim 1, wherein between the second circumferential groove and the third circumferential groove, the push-in fitting has a cylindrical guide zone for tightly guiding the end section in an associated channel of the mating element.

12. A combination of a plastic push-in fitting, a securing element and a plastic fluid line according to claim 1, wherein the end section is formed from polyamide 12, while the push-in fitting is formed from polyamide 6.6 with a glass fiber content of 35%.

13. A combination of a plastic push-in fitting, a securing element and a plastic fluid line according to claim 12, wherein the two polyamides are adhesion-modified in order to improve the binding of the materials.

* * * * *